(12) United States Patent
Burkhardt

(10) Patent No.: US 6,583,435 B2
(45) Date of Patent: Jun. 24, 2003

(54) MANUAL OPERATING MEANS FOR VALVES

(75) Inventor: Werner Burkhardt, Esslingen (DE)

(73) Assignee: Festo AG & Co., Esslingen (DE)

( * ) Notice: Subject to any disclaimer, the term of this patent is extended or adjusted under 35 U.S.C. 154(b) by 115 days.

(21) Appl. No.: 09/897,669

(22) Filed: Jul. 2, 2001

(65) Prior Publication Data

US 2002/0024033 A1 Feb. 28, 2002

(30) Foreign Application Priority Data

Jul. 28, 2000 (DE) .......................................... 200 13 052

(51) Int. Cl.⁷ .............................................. F16K 31/44
(52) U.S. Cl. .......................... 257/14; 257/319; 137/845
(58) Field of Search ............................ 257/14, 129.03, 257/318, 319; 137/845

(56) References Cited

U.S. PATENT DOCUMENTS

| 2,757,516 A | * | 8/1956 | Buttolph ....................... 251/14 |
| 3,016,920 A | * | 1/1962 | Thomsen et al. ......... 251/129.03 |
| 3,231,790 A | * | 1/1966 | Vander Kaay et al. .. 251/129.03 |
| 3,236,494 A | * | 2/1966 | Frantz .................... 251/129.03 |
| 3,332,445 A | * | 7/1967 | Allen ...................... 251/129.03 |
| 3,559,686 A | * | 2/1971 | Hoffman ................. 137/625.64 |
| 3,734,455 A | * | 5/1973 | Natho et al. .................. 251/14 |
| 3,789,875 A | * | 2/1974 | McGee ......................... 251/14 |
| 3,952,774 A |   | 4/1976 | Loveless |
| 4,352,364 A | * | 10/1982 | Orsino et al. ................ 251/357 |
| 4,544,128 A | * | 10/1985 | Kolchinsky et al. ... 251/129.03 |
| 4,603,832 A | * | 8/1986 | Sjoquist .................. 251/129.03 |
| 4,611,631 A | * | 9/1986 | Kosugi et al. .......... 251/129.19 |
| 4,744,386 A | * | 5/1988 | Frazer ........................ 251/63.6 |
| 5,860,450 A |   | 1/1999 | Trudeau et al. |

FOREIGN PATENT DOCUMENTS

| DE | 3141705 A1 | 4/1983 |
| DE | 4140233 A1 | 6/1992 |

* cited by examiner

Primary Examiner—Ehud Gartenberg
Assistant Examiner—John Bastianelli
(74) Attorney, Agent, or Firm—Hoffmann & Baron, LLP

(57) ABSTRACT

A manual operating means for the manual emergency and/or auxiliary operation of a normally electrically or pneumatically actuated valve. Same comprises a manual operating member which in a ready for use condition is so fixed at a housing recess in the valve in a sealing manner that its inner side faces the interior of the housing recess and its outer side is accessible for the application of a manual operating force. The manual operating member is provided with venting means which, in order to avoid the establishment of gage pressure in the housing recess due to leakage, render possible the flow of air from the inner side to the outer side thereof and in the opposite direction prevent the entry of foreign matter in the opposite direction.

13 Claims, 1 Drawing Sheet

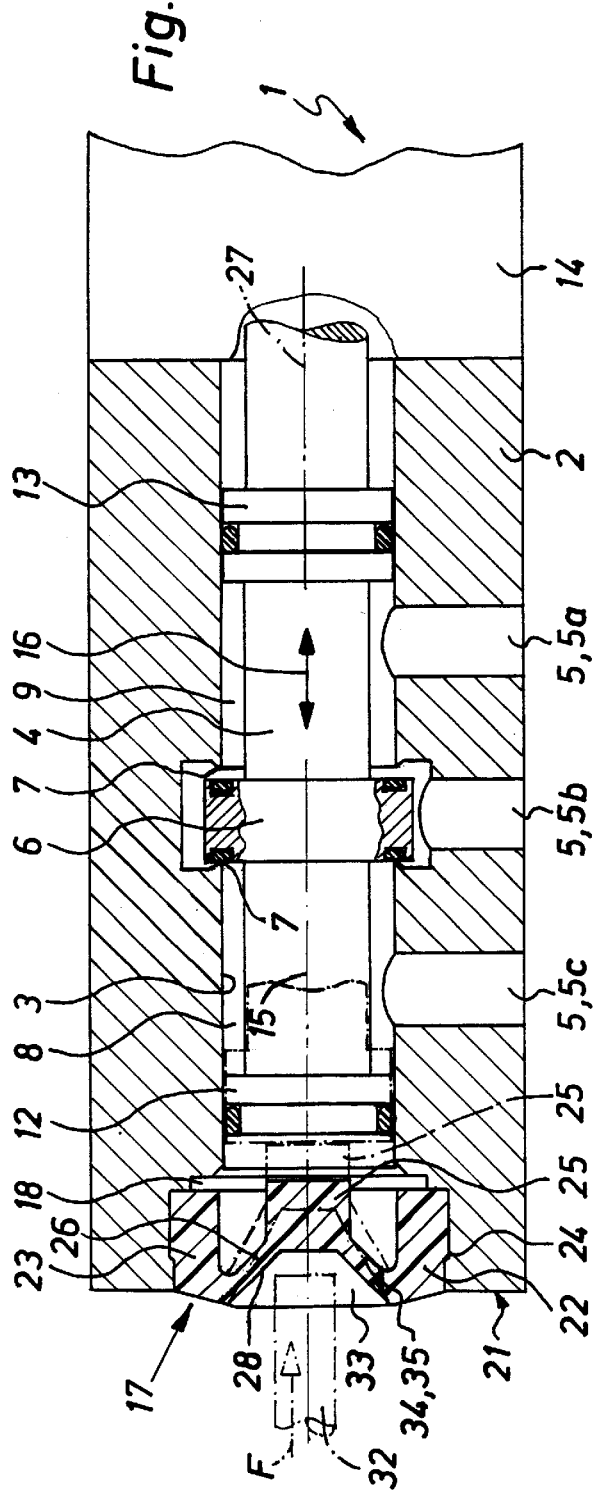
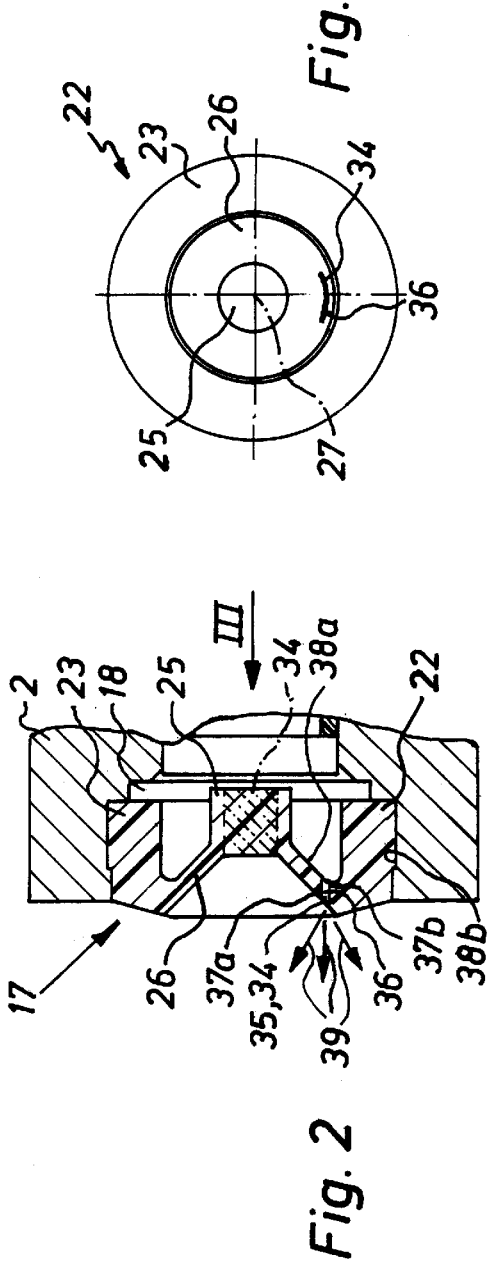
Fig. 1
Fig. 2
Fig. 3

MANUAL OPERATING MEANS FOR VALVES

BACKGROUND OF THE INVENTION

The invention relates to a manual operating means for the emergency and/or auxiliary operation of a normally electrically or pneumatically actuated valve, comprising a manual operating member which in a ready for use condition is so fixed at a housing recess in the valve in a sealing manner that its inner side faces the interior of the housing recess and its outer side is accessible for the application of a manual operating force.

THE PRIOR ART

Such a manual operating means is disclosed in the European patent publication 0 185 168 B1. In the case of this known design a plunger-like manual operating member is held trapped in a housing recess, the housing recess being connected with a receiving space containing a movable valve member. During normal operation of the valve the valve member is electrically and more particularly electromagnetically activated. In an emergency or for test purposes it is however possible for the valve member to be operated manually as well by the application of a manual operating force from the outside on the manual actuating member, which is then shifted and acts on the valve member. In order to ensure that the pressure medium controlled by the valve member does not emerge from the valve member in an uncontrolled fashion, the manual operating member is fixed in the housing's recess in a sealed manner.

Further designs of manual operating means are for instance disclosed in the German patent publication 4,224, 942 A1, in the German patent publication 19,801,201 A1 and the German patent publication 4,203,164 A1.

Independently of the presence of a manual operating means in the case of valves serving for the control of a gaseous medium such as compressed air there is the problem that a certain fraction of the medium to be controlled will spread out in the interior of the valve owing to leakage in a chaotic manner and this leads to gage pressures which in turn may impair the function of the valve.

SHORT SUMMARY OF THE INVENTION

One object of the invention is to avoid such excess or gage pressure problems and simultaneously to protect the internal components of the valve against damage by foreign matter such as moisture and dirt.

In order to achieve these and/or other objects appearing from the present specification, claims and drawings, in the present invention a manual operating means of the type initially mentioned is characterized in that the manual operating member is provided with venting means which, in order to avoid the establishment of gage pressure in the housing recess due to leakage, render possible the flow of air from the inner side to the outer side thereof and in the opposite direction prevent the entry of non gaseous foreign matter.

It is in this manner that a manual operating means is provided, whose manual operating member simultaneously performs a plurality of functions. On the one hand it serves for the manual or emergency operation of the valve fitted with the manual operating means. On the other hand it performs the function of a cover or closure for closing the associated housing recess in a sealing manner so that foreign matter such as moisture or dirt, not in the form of a gas, is then prevented from entering the valve. Furthermore, it performs a venting function as regards the associated housing and the regions connected with same of the valve and accordingly prevents any undesired establishment of pressure in the interior of the valve due to leakage. All this is achieved with an extremely small number of parts, a small space requirement and at reduced costs.

Although it would be possible to perform the venting of the valve's interior by separate venting ducts having their own filters which prevent the entry of dirt moisture, the amount of design and manufacturing complexity would then be relatively large, more particularly since the desired manual operating means must be additionally designed as a separate structure.

Advantageous further developments of the invention will appear from the claims.

The manual operating member will best comprise a holding section serving for fixing to the associated valve and an operating section able to be moved in relation to the holding section, a resilient connection being provided between the holding section and the operating section. In this case the holding section is more particularly in the form of a ring and surrounds the centrally placed operating section coaxially, a resilient connecting section extending between the two sections, again in a preferably coaxial manner, such connecting section having a hollow conical configuration and delimiting a funnel-like recess open to the outside. This funnel-like recess or socket is more particularly suitable for the application of a thrusting tool for the manual operating force.

It is preferred for the resilient connection between the holding section and the operating section to have rubber-elastic properties and for same to consist of a material with rubber-like elastic properties, more especially an elastomeric material or rubber. In this connection it is particularly advantageous to employ a manual operating means, whose manual operating member is in the form of an integral body having rubber elastic properties. In any case with the resilient design it is possible to save the costs involved with the additional use of a mechanical return spring and there is the possibility of a particularly low-cost form of manufacture.

The ring-like holding section of the manual operating member can be adapted for fitting in the housing recess of the associated valve with a press fit. Additionally or as an alternative an interlocking attachment in place may be provided for, the holding section being possibly stepped on the outer periphery thereof so that the result is an annular, surrounding holding step or ledge able to cooperate with a ledge inside the housing recess of the associated valve. If the annular holding section is made of a rubber-like resilient, it is then possible to provide for a sealed attachment in place without additional sealing means.

The venting means may be provided in a particularly simple manner if same are in the form of at least one check valve, which permits air flow, due to gage pressure, from the inside to the outside of the manual operating member while nevertheless preventing flow in the opposite direction. Prevention of air flow in the opposite direction simultaneously means the exclusion of foreign matter.

The check valve is preferably designed in the form of a rubber-like resilient material region of the manual operating member, it more particularly being a question of an integral component of the manual operating member. Such a structure is more particularly advantageous when the manual operating member is in the form of an integral elastic member. In order to provide the check valve it is possible for the manual operating member to be slotted in a rubber-like part thereof so that there is an opening which is delimited by sealing faces in closed or sealing contact with each other and which may spread apart to free the opening when there is a gage pressure in the interior of the manual operating member and which after pressure has been equalized may automatically return into engagement with each other with a sealing force operative between them.

In the case of an alternative design the venting means are defined by fine-pored material, as for instance a sintered material, the pore size being so minimized that while it is possible for air to leak off to the outside, liquid and solid foreign matter is prevented from entering. In this manner as well it becomes possible to adhere to the IP 65 safety standard.

Further advantageous developments and convenient forms of the invention will be understood from the following detailed descriptive disclosure of one embodiment thereof in conjunction with the accompanying drawings.

LIST OF THE SEVERAL VIEWS OF THE FIGURES

FIG. 1 shows a normally electrically operated valve, partly in longitudinal section, which is provided with a preferred design of the manual operating means, the manual operating means being illustrated in the non-operated condition thereof, while the operated state is indicated in chained lines.

FIG. 2 shows a sectioned view of part of the arrangement of FIG. 1 relating to the manual operating means, there being the departure from FIG. 1 that the venting means in the form of a check valve being indicated at the instant of venting.

FIG. 3 shows the manual operating member of FIGS. 1 and 2 in a separate end-on view looking in the direction III of FIG. 2.

DETAILED ACCOUNT OF WORKING EMBODIMENT OF THE INVENTION

FIG. 1 shows as an example and in a highly diagrammatic form a valve 1 serving for the control of the flow of pressure medium, the pressure medium to be controlled being a gas and more particularly compressed air.

The valve 1 possesses a valve housing 2, in which a preferably elongated receiving space 3 is provided, which contains an elongated valve member 4.

Peripherally a plurality of valve ducts 5 open into the receiving space 3 and more particularly open respectively at an outer side of the valve housing 2.

The valve 1 of the working embodiment is a 3/2 way valve, one valve duct 5 serving as a supply duct 5a, whereas two further valve ducts represent a power duct 5b and a venting duct 5c. The power duct 5b opens axially between the two other ducts 5a and 5c into the working or receiving space 3.

The valve member 4 has a control section 6 with a larger diameter, at the two ends or axial sides of which there is respectively an opposite valve seat 7, which respectively defines the inlet region of an axially adjoining valve space 8 and 9 surrounding the valve member 4, such valve space 8 and 9 being respectively formed by a component of the receiving space 3. While the power duct 5b opens into the part of the receiving space containing the control section 6, the supply duct 5a and the venting duct 5c communicate with one respective one of the two valve spaces 8 and 9. On the side opposite to the control section 6 the valve spaces 8 and 9 are shut off by closure sections 12 and 13 of the valve housing 4, such sections 12 and 13 cooperating in a sealing manner with the inner side of the receiving space 3.

The valve 1 is fitted with an operating means 14, which normally renders possible an electrical operation of the valve 1. In the working example it is arranged on an end side of the valve housing 2 and designed in the form of an electromagnetic operating means, which contains at least one electromagnet able to reciprocate the valve member 4 in the direction of the longitudinal axis 15 of the receiving space 3. This movement, which is termed a switching movement, is indicated by the double arrow 16.

Instead of the electrical operating means 14 it would be also possible to have any other desired operating means driven by external power, as for instance a pneumatically operating actuating means.

During the switching movement 16 the valve member 4 may be moved between two switching positions, in which it has its control section 6 respectively in engagement with one valve seat 7 and simultaneously is moved clear of the respectively other valve seat. This means that a connection is either produced between the supply duct 5a and the power duct 5b while at the same time the venting duct 5c is disconnected, or a connection is made between the power duct 5b and the venting duct 5c, the supply duct 5a being simultaneously shut off.

In circumstances such as putting the system into operation, in connection with servicing operations and on failure of the power supply or the like, there may be a need to operate the valve means 4 by hand. Here it is possible to speak of a manual emergency and/or auxiliary operation of the normally electrically or pneumatically driven valve. This is made possible because the valve 1 is designed with a manual operating means 17.

The manual operating means 17 comprises a manual operating member 22 which in the ready for use state is fixed in a recess 18 in the valve housing 2 of the valve in a sealing manner. The housing recess 18 in the illustrated working example is constituted by an axial end section of the receiving space 3 opposite to the operating means 14 and opens toward at the associated end side 21 of the valve housing 2. Owing to the closure section 12 of the valve housing 4, which faces same and which is constantly in sealing contact with the valve housing 2, it is possible to ensure that the housing recess is separated from the valve ducts 5, which conduct the pressure medium to be controlled, and the valve spaces 8 and 9 in a sealing fashion.

The manual operating member 22 is preferably designed like a cover and best has at least a major part of its overall length in the housing recess 18 so that it does not project past the valve housing 2 at all or only does so to a slight extent. It simultaneously constitutes a mechanical closure for the receiving space 3 and, respectively, the housing recess 18 and prevents entry of foreign liquid or solid matter.

There is the special provision that the manual operating member 22 has a holding section 23 serving for attachment thereof to the valve housing 2, such holding section 23 preferably being annular in form and extending into a length section of the housing recess 18, which is complementary in shape, when the manual operating member 22 is mounted. In order to dispense with having separate seals, the holding assembly 23 consists of a material with rubber-like properties, it being seated with an at least slight press fit in the housing recess 18 so that the desired sealing effect is produced.

In addition it is possible for the holding section 23 to have at least one step or ledge on its outer periphery so that an annular surrounding holding step 24 is produced, which fits behind a step in the housing recess 18 and an interlocking anchoring joint is produced.

Furthermore, the manual operating member 22 comprises an operating section 25, which for instance is in the form of a plunger or disk and which is located in the central part of the manual operating member 22, it being coaxially surrounded by the holding section 23. It is connected by means of a connection section 26, which defines a resilient connection, with the holding section 23, the resilient connection being so designed that the operating section 25 may be moved by manually applied forces in relation to the holding section 23 in the direction of the longitudinal axis 27 of the manual operating member 22. This longitudinal axis 27 preferably coincides with the longitudinal axis 15 of the valve member 4 to be actuated.

The resilient connection is preferably a rubber-like connection which is produced by the connection section 26 being made of a material with rubber-like properties, and more particularly of a suitable elastomeric material or rubber.

When the manual operating means 17 is not activated we have the home position illustrated in FIG. 1, the operating section 25 being arranged with an axial distance between it and the valve means 4 whatever the switching position of the valve member 4, it being at least to a major extent plunged into the cross section defined by the holding section 23. In order to cause an emergency or auxiliary operation to take place, an operating force F is applied manually to the outer side, facing away from the housing recess 22 and preferably on the outer face 28 of the operating section 25. This may be done directly using the finger of one hand or, as indicated in chained lines in FIG. 1, by the intermediary of a thrusting tool 32 held in the hand, for instance in the form of an actuating pin.

Owing to the actuation the operating section 25 will move in relation to the holding section 23 toward the valve member 4, which it consequently acts on and pushes it along in front of it. Accordingly it is possible to change the switching position of the valve housing 4. The situation arrived at in a state of activation of the manual operating means 17 as are indicated in chained lines in FIG. 1.

On shifting the operating section 25 there is, more particularly in the connection section 26, an elastic deformation, the connection section 26 being possibly extended so that a return force effective between the holding section 23 and the operating section 25 is established. Without any further mechanical spring means this causes an automatic return of the operating section 25 into the home position, when the operating force F is discontinued.

It is particularly advantageous for the connection section 26 to be so designed that it assumes the configuration of a hollow cone with a relatively thin wall. At is terminal section with the larger diameter it is secured to the outwardly facing terminal portion of the holding section 23, whereas its terminal section with a smaller diameter is turned toward the interior of the housing recess 18 and acts on the operating section 25. Accordingly the connection section 26 delimits a funnel-like recess 33 or socket open toward the outer side of the manual operating member 22, such recess 33 favoring the centered application of a thrusting tool 32 to the outer face 28, which is to be acted on, of the operating section 25.

In the case of the particularly economic design of the working example the manual operating member 22 is generally in the form of a body with a single step, which is entirely manufactured of a rubber-like elastic material. In this respect a single, integral material may be employed or it may be a question of a multi-component design. The manual operating member 22 may thus be produced extremely simply and at a low price as an injection molding.

Although the housing recess 18 is screened off from the pressure transmitting zones of the valve 1 it is not possible to exclude the possibility of pressure medium leaking from one of the adjacent valve ducts or valve spaces into the housing recess 18. This could be the cause of an excessive pressure acting on the valve member 4 and impairing the switching function thereof. In order to prevent such problem the manual operating member 22 is directly provided with venting means 34 which in order to avoid the build up of an excessive pressure in the housing recess 18 due to leakage render possible air flow from the inner side, facing the housing recess 18, of the manual operating member 22 to its outer side and thus to the atmosphere. The venting means 34 are in this case at the same time so designed and that in the opposite direction, that is to say starting with the atmosphere toward the inner side, facing the valve member 4, of the manual operating 22 they do prevent entry of foreign matter, as for instance dirt and drops of liquid. Accordingly on the one hand the build up of pressure in the inner part, screened off by the manual operating member 22, of the valve 1 is checked and on the other hand such inner part is protected against dirt coming in from the outside so that the arrangement complies with the safety standard IP 56.

It would be possible to employ a fine-pored material as a venting means, which is integrated in the manual operating member 22, and placed for example directly in the operating section 25. Such a design is illustrated in chained lines in FIG. 2. As a venting means it would for example be possible to use a sintered material.

In the case of the working example of FIGS. 1 through 3 the venting means 34 are constituted by a check valve 35, which is provided on the manual operating member 22. In principle several parallel connected check valves could be provided. This check valve 35 is so designed that in the case of there being equal pressures on the outer side and the inner side the check valve assumes the closed position in accordance with FIG. 1 and moves into an open position in accordance with FIG. 2, when the pressure on the inner side of the manual operating member 22 is greater than the atmospheric pressure acting on the outer side. Accordingly flow of air due to excess pressure is possible from the inner side to the outer side while being prevented in the opposite direction. In other words, the check valve 35 will only open when an excess pressure is being built up on the inner side so that in all cases entry of any foreign matter of any sort into the housing recess 18 is prevented.

Although it would in principle be possible to design the check valve 35 in the form of a separate component of the manual operating member 22, in the case of the particularly economic design of the working example the check valve 35 is an integral component of the manual operating member 22. The latter is provided with an axially continuous or through opening 36, which is delimited by sealing sides 37a and 37b in abutment with each other in the closed condition, and which are able spread apart or moved clear of one another (FIG. 2) when there is an excess pressure in order to free the opening 36 and to permit air flow as indicated by the arrows 39.

The opening 36 of the check valve 35 is preferably designed as a slot, FIG. 3 indicating that a circularly arcuate form is possible, whose center of curvature is on the longitudinal axis 27 of the of the manual operating member 22.

In order to make opening of the opening 36 possible when there is an excess or gage pressure, the manual operating member 22 is preferably so designed that the inner faces 38*a* and 38*b* adjoining the two sealing faces 37*a* and 37*b* run together at an acute angle on the inner side of the manual operating member 22. It is in this manner that it is possible to ensure that the pressure forces occurring may thrust together the regions having the inner faces 38*a* and 38*b*, of the manual operating member 22 and accordingly also the sealing faces 37*a* and 37*b*. It will be clear that any other suitable type of design of the inner sides would be possible as well which makes this effect possible.

The outer faces of the manual operating member 22 adjacent to the opening 36 are best designed with the opposite effect in mind. In this case a gage or excess pressure would cause a greater thrusting together of the sealing faces 37*a* and 37*b*.

The above situation and system may be produced in a particularly simple manner if the opening 36 and accordingly the check valve 35, as illustrated, are placed in the transition zone between the connection section 26 and the holding section 23 of the manual operating member 22.

What is claimed is:

1. A manual operating means for the emergency and/or auxiliary operation of a normally electrically or pneumatically actuated valve, comprising a manual operating member which in a ready for use condition is so fixed at a housing recess in the valve in a sealing manner that its inner side faces the interior of the housing recess and its outer side is accessible for the application of a manual operating force, wherein the manual operating member is provided with venting means which, in order to avoid the establishment of excess pressure in the housing recess due to leakage, render possible the flow of air from the inner side to the outer side thereof and prevent the entry of nongaseous foreign matter in the opposite direction, wherein said venting means comprises a slot formed in said manual operating member, said slot including sealing faces in sealing contact with one another, said sealing faces being separable for opening said slot when there is an excess pressure on the inner side of said manual operating member.

2. The manual operating means as set forth in claim 1, wherein the manual operating member possesses a holding section serving for attachment to the valve and an operating section able to be manually moved in relation to the holding section, a resiliently elastic connection being provided between the holding section and the operating section.

3. The manual operating means as set forth in claim 2, wherein the holding section is in an annular form and coaxially surrounds a coaxially placed operating section, a resiliently elastic connection section being provided coaxially therebetween, such connection section delimiting a funnel-like recess open to the outer side.

4. The manual operating means as set forth in claim 2, wherein the resiliently elastic connection is designed in the form of a rubber-elastic connection.

5. The manual operating means as set forth in claim 4, wherein at least in the connection section defining the rubber-elastic connection, the manual operating member consists of a material with rubber-elastic properties.

6. The manual operating means as set forth in claim 1, wherein the operating member is designed in the form of a body consisting of rubber-elastic material.

7. The manual operating means as set forth in claim 1, wherein the manual operating member possesses an annular holding section at its outer periphery, such holding section comprising rubber-elastic material and being provided for producing a press fit of the manual operating member in the housing recess of the associated valve.

8. The manual operating means as set forth in claim 7, wherein the annular holding section is stepped on its outer periphery so that at least one annular surrounding holding ledge or step is produced for interlocking anchoring in a housing recess, which is also stepped, in the associated valve.

9. The manual operating means as set forth in claim 1, wherein the slot comprises at least one check valve, which renders possible a gage pressure-dependent flow of air from the inner side to the outer side of the manual operating member and prevents such flow in the opposite direction.

10. The manual operating means as set forth in claim 1, wherein the slot is formed in a rubber-elastic material portion of the manual operating member.

11. The manual operating means as set forth in claim 1 wherein the venting means comprises fine-pored material.

12. The manual operating means as set forth in claim 1, wherein the manual operating member is designed in the form of a cover.

13. The manual operating means as set forth in claim 1, wherein the valve includes valve ducts for conducting a pressure medium to be controlled and wherein the housing recess of the valve, which is associated with the manual operating member in the ready for use condition, is separated from the valve ducts, the housing recess being constituted by an axial end section of a receiving space containing a movable valve member, of the respective valve.

* * * * *